United States Patent
Leone (10) Patent No.: US 9,556,784 B2
(45) Date of Patent: Jan. 31, 2017

(54) METHOD AND SYSTEM FOR VACUUM CONTROL

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 708 days.

(21) Appl. No.: 13/829,976

(22) Filed: Mar. 14, 2013

(65) Prior Publication Data

US 2014/0261301 A1 Sep. 18, 2014

(51) Int. Cl.

| F02B 17/00 | (2006.01) |
|---|---|
| F02D 41/30 | (2006.01) |
| F02D 41/00 | (2006.01) |
| F02B 23/10 | (2006.01) |
| F02D 13/02 | (2006.01) |
| F02D 19/08 | (2006.01) |

(52) U.S. Cl.
CPC ......... F02B 17/005 (2013.01); F02D 41/0002 (2013.01); F02D 41/3094 (2013.01); F02B 23/104 (2013.01); F02D 13/0219 (2013.01); F02D 19/084 (2013.01); F02D 2250/41 (2013.01); Y02T 10/36 (2013.01); Y02T 10/42 (2013.01)

(58) Field of Classification Search
CPC .. F02D 41/3094; F02D 41/0025; F02D 41/30; F02D 19/0689; F02D 19/061; F02D 41/0002; Y02T 10/123; F02B 17/005
See application file for complete search history.

(56) References Cited

U.S. PATENT DOCUMENTS

| 8,037,874 | B2 | 10/2011 | Glugla | |
|---|---|---|---|---|
| 8,100,107 | B2 | 1/2012 | Bidner et al. | |
| 8,165,788 | B2 | 4/2012 | Surnilla et al. | |
| 8,447,496 | B2 | 5/2013 | Krengel et al. | |
| 2010/0161203 | A1* | 6/2010 | Shigenaga | F02D 13/0215 701/110 |
| 2011/0048393 | A1* | 3/2011 | Akita | F02D 41/0032 123/704 |
| 2011/0162620 | A1* | 7/2011 | Bidner | F02D 41/0025 123/299 |
| 2011/0259290 | A1* | 10/2011 | Michikawauchi | F02M 25/14 123/1 A |
| 2013/0152903 | A1* | 6/2013 | Leone | F02D 41/062 123/491 |
| 2015/0025777 | A1* | 1/2015 | Pursifull | F02D 41/0032 701/104 |

* cited by examiner

*Primary Examiner* — Sizo Vilakazi
(74) *Attorney, Agent, or Firm* — Julia Voutyras; Alleman Hall McCoy Russell & Tuttle LLP (57) ABSTRACT

Methods and systems are provided for adjusting a fuel injection split between a direct injection and a port injection based on engine vacuum demand. When more intake manifold vacuum is required, relatively more direct injection is used to take advantage of the associated throttling for generating vacuum. The vacuum may then be used for canister purging, crankcase ventilation, or actuating an engine vacuum consumption device.

20 Claims, 4 Drawing Sheets

METHOD AND SYSTEM FOR VACUUM CONTROL

FIELD

The present application relates to methods and systems for controlling fuel injection in an engine system based on engine vacuum requirement.

BACKGROUND AND SUMMARY

Engines may be configured with direct fuel injectors that inject fuel directly into a combustion chamber (direct injection), and/or with port fuel injectors that inject fuel into an intake port (port fuel injection). The combined use of port injection and direct injection of a fuel allows the various benefits of each type of injection to be leveraged. For example, with port fuel injectors, the fuel is typically sprayed into the intake valves and ports. The injected fuel evaporates primarily due to contact with hot metal surfaces and/or due to backflow of hot exhaust gases during valve overlap. In contrast, with direct fuel injectors, fuel is sprayed directly into the combustion chamber and the injected fuel evaporates primarily due to smaller droplet size and thorough mixing. In addition, since there is little impingement of fuel onto metal surfaces, direct fuel injection results in more evaporative cooling of the aircharge.

Engine control systems may vary a ratio of fuel injected via port injection and direct injection based on operating conditions. In one approach, as shown by Glugla in U.S. Pat. No. 8,037,874, a larger proportion of fuel is provided to a cylinder via direct injection in response to an indication of knock. Therein, at high loads, when the engine is knock-limited, the increased evaporative cooling of the direct injection and denser aircharge at wide open throttle conditions results in improved volumetric efficiency, leading to higher torque and power at the high load conditions. In addition, the cylinder charge cooling mitigates knock. In contrast, at part-load conditions, direct injection results in a small but measurable penalty in pumping work. This is because the increased evaporative cooling from direct fuel injection results in a denser aircharge which requires the engine to be throttled more to provide a desired torque output. To reduce this penalty, engine control systems may use a higher proportion of port injection at low-load and mid-load conditions.

The inventors herein have recognized that there may be conditions where it may be advantageous to pay the penalty in pumping work so as to use the pumping work for vacuum generation. Specifically, during mid-load conditions, if additional vacuum is required, such as for purging a fuel vapor canister, for crankcase ventilation, or for actuation of an engine vacuum consumer (e.g., a brake booster), the extra pumping work and extra throttling associated with direct injection of a fuel may be used to lower intake manifold pressure. The extra vacuum generated via the throttling may then be used to meet the vacuum demand.

In one example, the above advantages can be achieved by a method of operating an engine comprising, in response to engine vacuum generation being lower than an engine vacuum demand, increasing a proportion of fuel injected into a cylinder via direct injection while correspondingly decreasing a proportion of the fuel injected into the cylinder via port injection. In this way, the increased throttling and pumping work associated with direct injection of a fuel at low-to-mid engine loads can be advantageously used to generate more vacuum at the engine.

In one example, an engine may be configured with both direct injection and port fuel injection of a fuel to the engine cylinders. An initial fuel injection amount, including a proportion of fuel to be injected into the cylinder via the direct injector relative to the port fuel injector, may be determined based on engine operating conditions, such as engine speed-load conditions. For example, during part-loads (e.g., low-to-mid engine loads), the initial fuel injection amount may include a higher proportion of port injection and a lower proportion of direct injection to improve engine pumping efficiency. In response to an increased vacuum demand during these conditions, such as for purging a fuel vapor canister, for crankcase ventilation, or for actuating a brake booster, the initial fuel injection amount may be adjusted. Specifically, the fuel injection amount may be shifted to include a higher proportion of direct injection and a correspondingly lower proportion of port injection of the given fuel. By increasing direct injection, a pumping work required to meet the torque demand is increased, leading to adjustment of an air intake throttle. The increased throttling lowers intake manifold pressure and increases vacuum generation. The increased vacuum allows the engine vacuum demand to be better met.

In this way, fuel injection to an engine cylinder may be adjusted based on an engine vacuum demand. Specifically, a shift from increased port injection of a fuel to increased direct injection of the fuel can be used to take advantage of the increased pumping work, and decreased manifold pressure level, associated with the direct injection. This allows the interaction of the inefficiencies of a direct injection system with engine vacuum generation to be leveraged to meet engine torque demand and vacuum demand. Overall, the pumping efficiency provided by port fuel injection is traded for the vacuum generation efficiency provided by direct fuel injection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
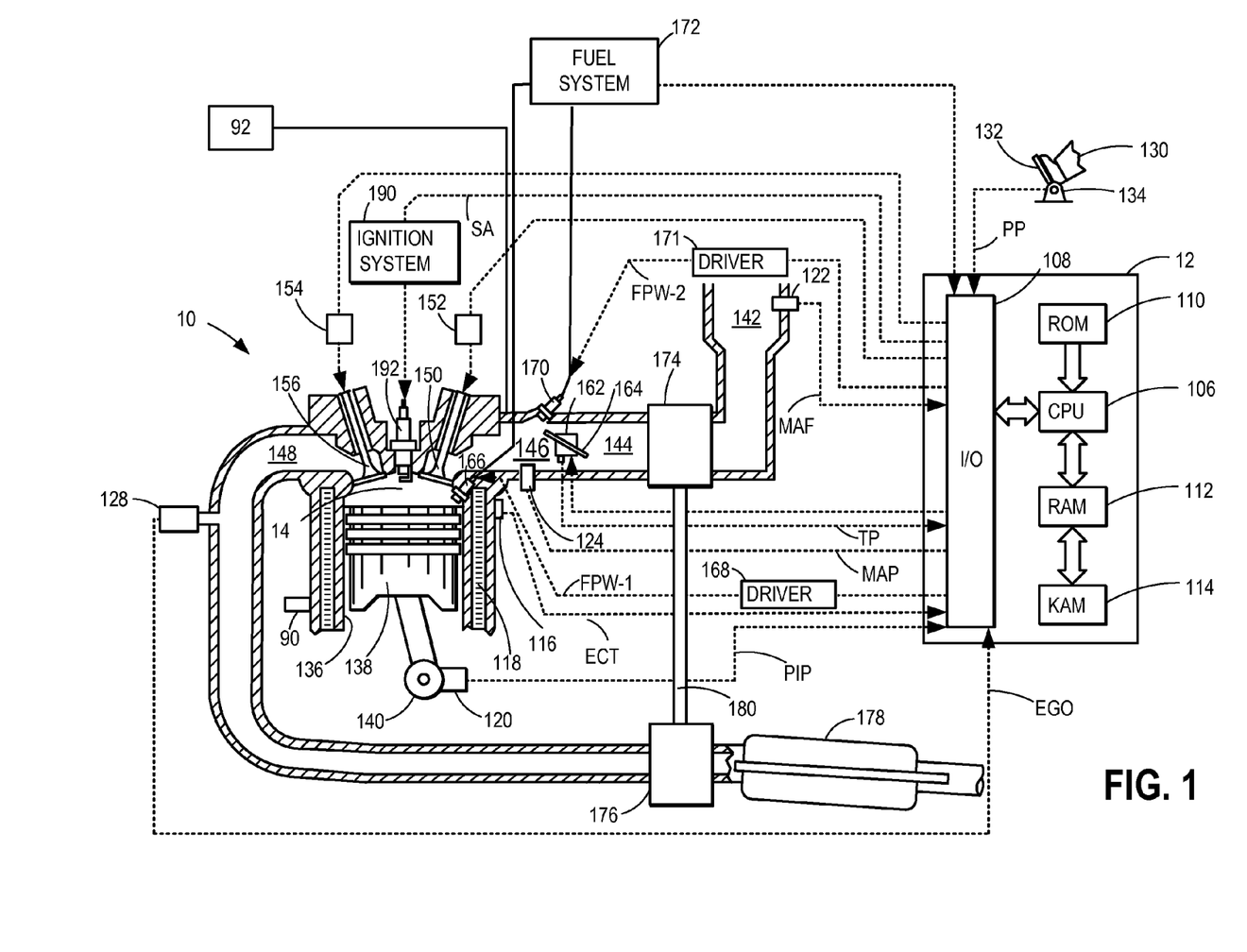
FIG. 1 shows an example combustion chamber.
Figure 2:
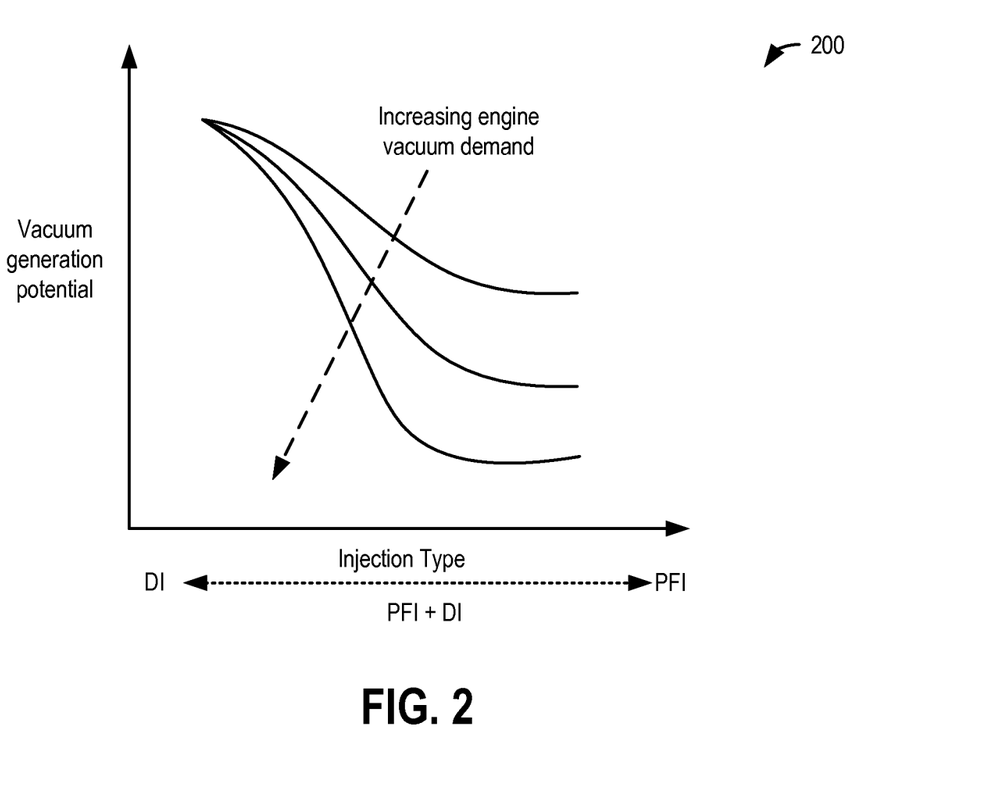
FIG. 2 shows a map of how a ratio of direct to port fuel injection is related to the vacuum generation potential of an engine.

The following description relates to systems and methods for adjusting an engine fuel injection, such as in the engine system of FIG. 1, based on a vacuum requirement of the engine. As elaborated herein with reference to FIG. 3, an engine controller may adjust a fuel injection setting, specifically a proportion of fuel direct injected to the engine relative to fuel port injected into the engine, based on the engine's vacuum needs. The engine may need additional intake manifold vacuum for purging a fuel vapor canister, for crankcase ventilation, for providing vacuum assist to a vacuum consumer (such as a brake booster), etc. In response to the vacuum being generated at the intake manifold being less than the vacuum needed by the various vacuum consumers, the engine control system may shift to delivering a larger proportion of the fuel via direct injection while reducing the proportion of fuel delivered via port injection. The additional pumping work associated with the direct injection is advantageously used to lower intake manifold vacuum levels and generate more vacuum for use by the vacuum consumers (FIG. 2). An example fuel injection adjustment is described with reference to FIG. 4.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below. The relative distribution of the total injected fuel among injectors 166 and 170 may be referred to as an injection ratio. For example, injecting a larger amount of the fuel for a combustion event via (port) injector 170 may be an example of a higher ratio of port to direct injection, while injecting a larger amount of the fuel for a combustion event via (direct) injector 166 may be a lower ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation.

Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

One or more engine vacuum consumption devices (or vacuum consumers) 92 may be coupled to the engine intake manifold. The vacuum consumption device may be directly actuated using vacuum from at least the engine intake manifold, for example, from intake passage 146, downstream of intake throttle 162. In still other examples, the vacuum consumption device may be driven using vacuum from a vacuum reservoir, wherein the reservoir is at least partially filled with vacuum drawn from the intake manifold, such as from intake passage 146. As one example, vacuum consumption device 92 may be a brake booster coupled to vehicle wheel brakes, the brake booster including a vacuum reservoir configured as a vacuum cavity behind a diaphragm of the brake booster. Therein, the vacuum reservoir may be an internal vacuum reservoir configured to amplify a force provided by the vehicle operator via a brake pedal for applying vehicle wheel brakes (not shown). In an alternate example, the vacuum consumption device may be coupled to a crankcase ventilation system of the engine wherein the intake manifold vacuum is used to draw blow-by gases out of the crankcase for purging to the engine. In still another example, the vacuum consumption device may be coupled to the engine's fuel system wherein the intake manifold vacuum is used to draw fuel vapors stored in a fuel vapor canister for purging to the engine.

As such, during non-boosted conditions, engine intake manifold pressure, as estimated in intake passage 146, is affected by the position of intake throttle 162. In particular, throttling of air intake throttle 162 leads to lowering of manifold pressure, and consequently, an increase in vacuum levels at the intake manifold. The throttling also affects torque output. When fuel is delivered to a cylinder via a direct injector, due to the fuel being sprayed directly into the combustion chamber, the injected fuel evaporates quickly due to smaller droplet size and thorough mixing. In addition, due to little impingement of fuel onto metal surfaces, there is evaporative cooling of the aircharge. When the engine is operated at high loads, such as when the engine may be knock-limited, the increased evaporative cooling of the direct injection and denser aircharge at wide open throttle conditions results in improved volumetric efficiency, leading to higher torque and power at the high load conditions. In addition, the cylinder charge cooling mitigates the knock. However, at part-load conditions, the direct injection results in a small but measurable penalty in pumping work. This is because the increased evaporative cooling from direct fuel injection results in a denser aircharge. This requires the engine to be throttled more to provide a desired torque output. To reduce this penalty, engine control systems may use a higher proportion of port injection at low-load and mid-load conditions.

However, the need for throttling when direct injecting fuel results in lower intake manifold pressure levels, and therefore increases the vacuum generation potential of the engine. As shown at map 200 of FIG. 2, there is a correlation between the injection type (e.g., ratio of fuel delivered via direct injection relative to port injection) and the vacuum generation potential. Specifically, as the proportion of fuel delivered to a cylinder via a direct injector increases, and the proportion of fuel delivered via a port injector correspondingly decreases, the amount of throttling associated with the fuel injection increases. This, in turn, increases the amount of vacuum that is generated in the intake manifold. The inventors herein have recognized that this vacuum generation potential can be harnessed, in particular at part engine loads, to improve the engine's vacuum output. That is, the interaction of the pumping work penalty of a direct injection system with engine vacuum generation ability can be leveraged to meet engine torque demand and vacuum demand. Thus, as shown at map 200, as the engine vacuum demand increases, a fuel injection profile may be shifted towards a setting having a higher proportion of direct fuel injection relative to port fuel injection.

Figure 3:
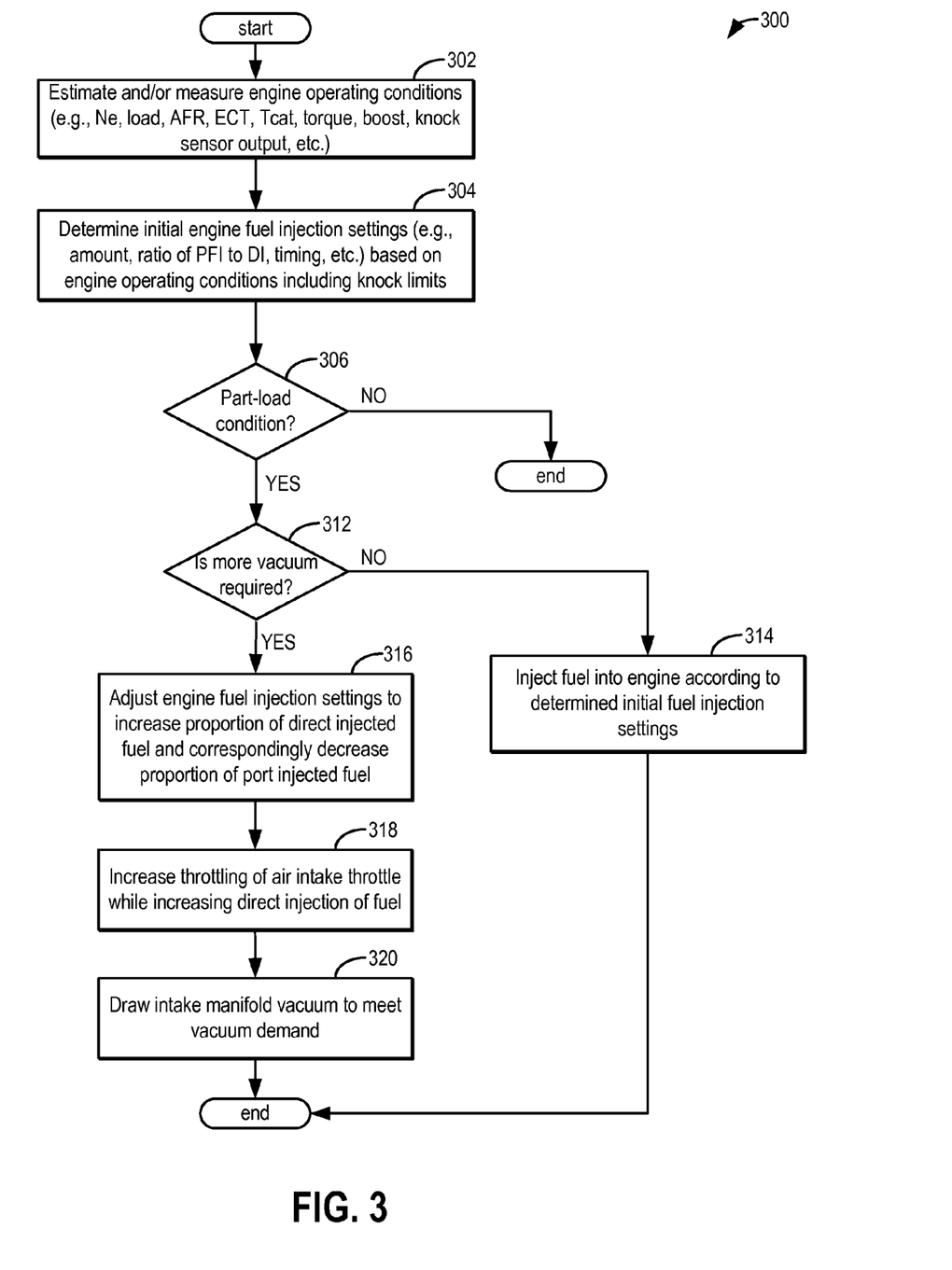
FIG. 3 shows a high level flow chart for adjusting fuel injection settings based on an engine vacuum requirement.

As elaborated with reference to FIG. 3, a controller may adjust a fuel injection profile during a cylinder combustion event, so as to take synergistic advantage of the charge cooling effect of direct injection and additional pumping work associated with the direct injection to use the pumping work for vacuum generation. Specifically, during mid-load conditions, if additional vacuum is required, such as for purging a fuel vapor canister, for crankcase ventilation, or for actuation of an engine vacuum consumer 92 (e.g., a brake booster), the extra pumping work and extra throttling associated with direct injection of a fuel may be used to lower intake manifold pressure and use the extra vacuum generated via the throttling to meet the vacuum demand.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Engine 10 may further include one or more knock sensors 90 distributed along an engine block, or coupled to individual cylinders (as shown). When included, the plurality of knock sensors may be distributed symmetrically or asymmetrically along the engine block. Knock sensor 90 may be an accelerometer, or an ionization sensor. An engine controller may be configured to detect abnormal combustion events due to cylinder knocking based on the output (e.g., signal timing, amplitude, intensity, frequency, etc.) of knock sensor 90. For example, a cylinder knock event may be determined based on a cylinder knock signal estimated in a window (such as a crank angle window after a spark ignition event in the cylinder) being larger than a threshold. Following detection, mitigating actions may be taken by the engine controller to address knock. For example, knock may be addressed using increased direct injection of a knock control fluid, spark ignition timing adjustments (e.g., spark retard), EGR, and combinations thereof.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; knock sensor 90, engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 3.

Now turning to FIG. 3, an example routine 300 is described for adjusting a ratio of fuel injected into an engine cylinder during a combustion event via a direct injector and a port injector based on engine vacuum demand. The approach enables the charge cooling effect of increased direct injection to be advantageously used to mitigate knock while using the additional pumping work associated with the direct injection for generating additional vacuum.

At 302, the routine includes estimating and/or measuring engine operating conditions. These include, for example, engine speed, torque demand, boost level, exhaust catalyst temperature, engine coolant temperature, knock sensor output signal, etc. The controller may monitor the knock sensor output signal (e.g., of knock sensor 90 of FIG. 1) in relation to a threshold level to determine if the engine is knock-limited (if knock is likely or detected). For example, cylinder knock may be indicated based on the output of the knock sensor being higher than a threshold level, when estimated in a crank angle window after a cylinder ignition event. The controller may also monitor the knock sensor output signal to determine if the engine is pre-ignition-limited (e.g., if pre-ignition is likely or detected). For example, pre-ignition may be indicated based on the output of the knock sensor being higher than a threshold level, when estimated in a crank angle window before a cylinder ignition event. In one example, the knock sensor output may be estimated in a first, earlier window and against a first, higher threshold to indicate pre-ignition, while the knock sensor output may be estimated in a second, later window and against a second, lower threshold to indicate knock. An indication of pre-ignition may also be based on a pre-ignition history of the engine.

At 304, an initial fuel injection setting may be determined based on the estimated operating conditions including based on knock limits and an indication of knock. For example, if the engine is at part load and no knock or pre-ignition is detected (or if knock and/or pre-ignition is not likely), most or all of the fuel may be port injected to minimize pumping work and maximize engine efficiency. As an alternate example, if the engine is at part load and knock is detected (or if knock is likely), a portion of the fuel may be direct injected while a remaining portion of the fuel is port injected.

Fuel injection settings determined at 304 may include, for example, a total amount of fuel to be injected into a cylinder, a proportion of the total fuel amount to be delivered to the cylinder via direct injection, a proportion of the total fuel amount to be delivered to the cylinder via port injection, as well as number of injection pulses and injection timings for each pulse. As an example, the amount of fuel (or proportion of the total fuel) that is direct injected into the an engine cylinder may be adjusted based on the indication of knock, with the direct injection amount increased and the port injection amount correspondingly decreased as the indication of knock increases and the engine becomes more knock limited.

At 306, it may be confirmed that the engine is in a part-load condition. This may include the engine operating at low or mid-load conditions (e.g., with engine load below a threshold). In one example, it may be confirmed that the engine is operating without boost. As such, if the engine is operating with boost, engine intake manifold pressure may be elevated, and intake manifold vacuum may not be of concern. If the engine is operating with boost, the routine may end and the controller may deliver fuel to the engine based on the determined initial fuel injection settings.

If the engine is operating at part-load conditions, then at 312, it may be determined if more engine vacuum is required. For example, engine vacuum generation may be compared to vacuum demand and it may be determined if the vacuum demand is being met by the engine vacuum generation. In one example, engine vacuum generation may be estimated based on an engine intake manifold vacuum level. Thus, as engine intake manifold vacuum level increases (that is, when there is lower absolute pressure in the manifold), engine vacuum generation may be determined to be higher.

The vacuum demand may be based on the amount of vacuum required for various vacuum-actuated devices (herein also referred to as vacuum consumers) coupled to the engine, as well as various vehicle systems requiring vacuum. For example, the engine vacuum demand may be based on one or more of canister purge vacuum demand (that is, the amount of vacuum required for purging fuel vapors from a fuel system canister), crankcase ventilation vacuum demand (that is, the amount of vacuum required for ventilating and removing blowby gases and fuel vapors from the crankcase), and vacuum consumer demand (that is, the amount of vacuum required to operate and actuate one or more vacuum consumers, or vacuum-actuated devices coupled to the engine system). The vacuum consumers may include, as one example, a brake booster. Alternate vacuum consumers include, for example, a wastegate actuator coupled to an exhaust turbine of the turbocharger.

If engine vacuum generation is sufficient to meet vacuum demand, then it may be determined that more vacuum is not required and the routine may proceed to 314 to maintain fuel injection settings as determined at 304. For example, if the intake manifold absolute pressure is sufficiently low to meet the vacuum demand, no further vacuum may be required. The controller may then inject fuel into the engine as per the determined initial fuel injection settings at 314. As such, a smaller throttle adjustment may be required during the fuel injection at 314. In one example, the throttle position is maintained and the throttle is not adjusted while fuel is injected as per the initially determined fuel injection settings at 314.

If, however, more engine vacuum is required, then at 316, the controller may adjust the initial fuel injection settings based on the vacuum demand to improve manifold vacuum generation. Specifically, in response to engine vacuum generation being lower than the vacuum demand, the routine includes increasing a proportion of fuel injected into a cylinder via direct injection while correspondingly decreasing a proportion of the fuel injected into the cylinder via port injection. Increasing a proportion of fuel injected into the cylinder via direct injection while correspondingly decreasing a proportion of the fuel injected into the cylinder via port injection includes increasing a pulse width of direct fuel injection while correspondingly decreasing a pulse width of port fuel injection to the cylinder. In addition, if the amount of fuel to be port injected into the cylinder is smaller than the minimum pulse width of the port injector, then all of the fuel may be direct injected.

As such, the increasing of the proportion of fuel delivered via direct injection may be based on a difference between the engine vacuum demand and the engine vacuum generation. For example, as the difference increases, the proportion of fuel delivered via direct injection may be increased. The proportion of fuel delivered by port injection may then be adjusted based on the increasing of the direct injection so as to maintain the total fuel injection and to maintain combustion at or around stoichiometry (or other desired lambda). At 318, while increasing the proportion of direct injected fuel, the routine includes increasing throttling of intake aircharge. For example, an air intake throttle may be actuated or adjusted. As such, the throttle adjustment used at 318 may be more than the throttle adjustment used at 314.

As such, at part-load conditions, the increased evaporative cooling of the (increased ratio of) direct injection leads to a denser aircharge. This, in turn, requires the engine to be throttled more (relative to the throttling required for the same amount of fuel delivered by port injection) to provide a desired torque output. While this leads to a penalty in terms of pumping work, the inventors herein have recognized that the additional pumping work associated with the direct injection can be advantageously used to further lower intake manifold pressures, increasing manifold vacuum generation. Thus, the increased proportion of direct injection and the associated additional throttling generates more vacuum that can meet a temporary increase in engine vacuum demand.

As such, the vacuum advantage from the direct injection is achieved while the engine is operating at part load. During these conditions, the increased direct injection and the increased throttling lowers manifold absolute pressure. At higher load conditions, such as when the engine is boosted, increased throttling may not lower manifold absolute pressure.

It will be appreciated that in addition to generating more intake vacuum, the increased direct injection at the part-load conditions also synergistically addresses knock and pre-ignition. In particular, the same increased direct injection not only improves vacuum generation at the engine, but also improves the knock limit and pre-ignition limit of the engine.

While the shift to increased direct injection synergistically addresses knock, in still further embodiments, the direct injection may be increased to provide vacuum and address knock or pre-ignition. For example, the extent to which the proportion of direct injection is increased responsive to the vacuum demand may be adjusted based on the vacuum demand as well as the engine's knock limit. As an example, during a first part load condition, when vacuum demand is higher than vacuum generation, and while the engine is not knock limited (or less knock-limited), the engine controller may increase direct injection of fuel to the engine by a first amount while correspondingly decreasing port injection of fuel to the engine. Then, during a second part load condition, when vacuum demand is higher than vacuum generation, and while the engine is knock limited (or more knock-limited), the engine controller may increase direct injection of fuel to the engine by a second amount that is larger than the first amount, while correspondingly decreasing port injection of fuel to the engine. In this way, during the first condition, the shift to increased direct injection is used to address the vacuum demand, while during the second condition, the shift to increased direct injection is used to address the vacuum demand and the indication of cylinder knock. Likewise, the shift to increased direct injection may be raised further in response to an indication of pre-ignition.

The controller may maintain the adjusted fuel injection setting with the increased proportion of direct injection and decreased proportion of port injection until the vacuum demand is met (e.g., until the engine intake manifold vacuum level is at or above engine vacuum demand) and until the indication of knock is reduced, if the engine is knock-limited or pre-ignition-limited (e.g., until knock sensor output is below the threshold level). At 320, the additional vacuum generated may be drawn from the engine intake manifold and used to meet the temporarily elevated vacuum demand. For example, the additional vacuum may be used for canister purging, crankcase ventilation, or brake booster actuation.

In some embodiments, the extent to which the proportion of direct injection is increased responsive to the vacuum demand may be adjusted based on the nature of the vacuum demand. For example, when the vacuum demand is used for canister purging or crankcase ventilation, where air-fuel ratio error adjustments are required in concert, the direct injection may be adjusted differently relative to when the vacuum demand is used for brake booster activation, where air-fuel ratio error adjustments are not required in concert. For example, if increased vacuum is required for canister purging or crankcase ventilation, then the total amount of fuel injected may be reduced due to the amount of fuel coming from the canister or crankcase. In this situation, it may be desired to simultaneously reduce total fuel injected and increase the proportion of fuel direct injected, which may require a larger reduction in the amount of fuel which is port injected.

In this way, during a first condition, a controller may shift fuel injection from increased direct injection of a fuel to increased port injection of the fuel to reduce pumping work and increase engine efficiency. Then, during a second condition, the controller may shift fuel injection from increased port injection to increased direct injection of the fuel to increase engine intake manifold vacuum. Herein, during the first condition, an engine vacuum generation is higher than a vacuum demand, while during the second condition, the engine vacuum generation is lower than a vacuum demand. During the second condition, the controller may shift fuel from increased port injection to increased direct injection based on the vacuum demand as well as the engine's knock limit with a relatively higher proportion of direct injection used when the engine is knock limited and a relatively lower proportion of direct injection used when the engine is not knock limited.

In one example, during a first part load condition, when vacuum requirement is below a threshold, a controller may direct inject a first amount of fuel and port inject a second amount of the fuel into a cylinder. Then, during a second part load condition, when engine vacuum requirement is above the threshold, the controller may increase the first amount of direct injected fuel while correspondingly decreasing the second amount of port injected fuel into the cylinder. During the first condition, the controller may throttle an air intake throttle less during the fuel injection while during the second condition, the controller may throttle the air intake throttle more during the fuel injection. The increasing of the first amount of direct injected fuel during the second condition may be based on a difference between an actual intake manifold vacuum level and the threshold, while the decreasing of the second amount of port injected fuel may be based on the increasing of the first amount to maintain combustion at or around stoichiometry or other desired air-to-fuel ratio (or lambda). Fuel injection with the increased first amount and the decreased second amount may then be maintained until the actual intake manifold vacuum level is at or above the threshold, and then initial fuel injection amounts are resumed. During a third part load condition, when vacuum requirement is above the threshold, the controller may increase the first amount of direct injected fuel while correspondingly decreasing the second amount of port injected fuel into the cylinder in response to an indication of cylinder knock (e.g., the indication being higher than a knock threshold), the increasing during the third part load condition being more than the increasing during the second part load condition. Herein, the increasing during the third condition may be used to both meet vacuum demand and address knock. For example, the increasing during the third part load condition may be based on the indication of knock, more direct injection used as the engine becomes more knock limited, and with the increasing maintained until the indication of knock is lower than a knock threshold and the engine vacuum demand is met.

Figure 4:
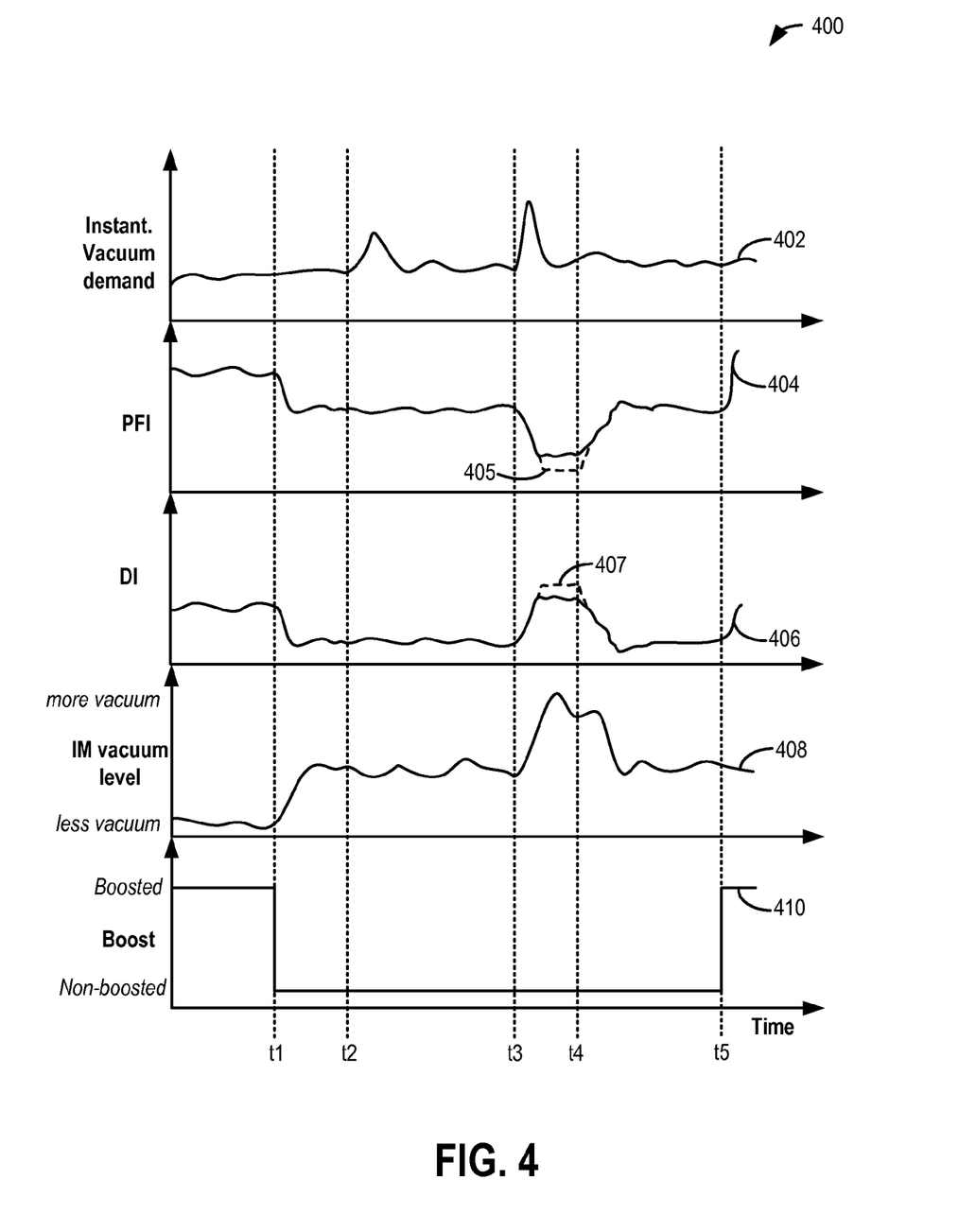
FIG. 4 shows an example fuel injection adjustment, according to the present disclosure.

Now turning to FIG. 4, map 400 shows an example of adjusting a ratio of fuel injected into an engine cylinder during a combustion event via a direct injector and a port injector based on engine vacuum demand. The approach allows a temporary increase in vacuum demand to be met. At the same time, synergistically, engine knock limits are improved. A control system of the engine including a controller may be configured with computer readable instructions for activating and deactivating the injectors, and/or adjusting a pulse width of fuel injection for the port injector and the direct injector in response to an engine vacuum demand. Map 400 depicts an instantaneous vacuum demand at plot 402, an amount of fuel that is port injected (PFI) at plot 404, an amount of fuel that is direct injected (DI) at plot 406, intake manifold vacuum levels at plot 408, and engine boost at plot 410. As such, by comparing plots 404 and 406, a proportion (or split ratio) of the total fuel that is delivered to an engine cylinder via direct injection relative to the proportion delivered via port injection may be ascertained.

Prior to t1, the engine may be operating boosted (plot 410) due to high operator torque demand. Based on engine operating conditions before t1, a fuel injection amount between the direct injector and the port injector may be determined. In the depicted example, a higher total amount of fuel, including a high fuel injection amount from both the port injector (plot 404) and the direct injector (plot 406) may be required to meet torque demand. As such, before t1, the engine may be operating with a relatively higher proportion of the total fuel delivered to the engine via port injection so as to reduce pumping work and increase engine efficiency at high load conditions. As a result of operating with boost, the absolute intake manifold pressure may be high, and the vacuum level at the intake manifold may be low (plot 408). In addition, there may be limited engine vacuum demand (plot 402). A vacuum demand may be continually monitored.

At t1, due to a change in operating conditions, such as due to a drop in engine load from high load conditions to part load conditions, boost delivery may be stopped, and the engine may be operated non-boosted (plot 410). In addition, the total amount of fuel delivered to the engine may be reduced (to meet the lowered torque demand). Specifically, the amount of fuel delivered via both the port injector and the direct injector may be lowered. As such, the engine may not be knock-limited at this part load condition, so a higher proportion of the total fuel may be delivered via port injection while a smaller proportion of the total fuel is delivered via direct injection (plots 404-406).

As such, due to the engine being operated at lower load, the absolute intake manifold pressure may drop and the intake manifold (IM) vacuum level may increase (plot 408). At t2, there may be an increase in engine vacuum demand, for example, due to actuation of a brake booster or ventilation of the crankcase. However, due to the IM vacuum level being sufficient to meet the instantaneous vacuum demand, the fuel injection profile may be maintained.

At t3, there may be another increase in engine vacuum demand, for example, due to fuel vapor purging from a fuel canister. In particular, the instantaneous vacuum demand at t3 may be higher than the vacuum demand at t2, and furthermore the vacuum demand may be higher than the vacuum generated at the intake manifold. In response to the vacuum demand being higher than the vacuum being generated, at t3, the fuel injection profile may be adjusted such that the fuel injection amount from the direct injector is increased while the fuel injection amount from the port injector is correspondingly decreased (while maintaining the total amount of fuel injection). In one example, the controller may increase the pulse width of injection of the direct injector while correspondingly decreasing the pulse width of injection of the port injector. In addition, the controller may increase throttling of an air intake throttle to meet the desired torque output. As a result of the increased throttling and pumping work associated with the increased direct injection, intake manifold vacuum levels may increase to meet the instantaneous increase in vacuum demand. The increased direct injection may also synergistically improve the knock limit of the engine under the given conditions. As such, the increased direct injection and decreased port injection may be maintained until the vacuum demand is met. Then, when the vacuum demand drops, at t4, the initial fuel injection profile may be resumed with the higher proportion of port fuel injection and lower proportion of direct fuel injection.

At t5, due to a change in operating conditions, such as due to a rise in engine load from part load conditions to high load conditions, boost delivery may be resumed, and the engine may be operated boosted (plot 410). In addition, a total amount of fuel delivered to the engine may be increased (to meet the increased torque demand). Specifically, the amount of fuel delivered via both the port injector and the direct injector may be increased while maintaining the proportion of fuel delivered to the engine via each injector.

It will be appreciated that in the depicted example, at t3, when vacuum demand increases above vacuum generation, the engine may not be knock-limited (or may be less knock-limited). However, in an alternate example, at t3, when vacuum demand increases above vacuum generation, the engine may also be knock-limited (or more knock-limited). If the engine is more knock-limited, the controller may further increase the amount of fuel direct injected while further decreasing the amount of fuel port injected so as to address both the vacuum demand and the knock. For example, as shown by segments 405 and 407 (dashed lines), during a part load condition where vacuum demand is higher and knock is (more) limited, more direct injection may be used as compared to a part load conditions where vacuum demand is higher and knock is not limited, or less limited (plots 404 and 406, solid lines). It will be appreciated that, likewise, the direct injection may be increased when the engine is pre-ignition limited, with the shift towards increased direct injection being higher when the vacuum demand is high and the engine is pre-ignition limited as compared to when the vacuum demand is high and the engine is knock-limited.

While not depicted, the injection amounts may be further adjusted based on an alcohol content of the injected fuel. For example, when the injected fuel has a higher alcohol content (such as E85), the pumping work associated with the direct injection may be higher, with a correspondingly higher vacuum generation potential. In comparison, when the injected fuel has a lower alcohol content (such as E10), the pumping work associated with the direct injection may be lower, with a correspondingly lower vacuum generation potential.

In one example, a ratio of fuel injected into an engine cylinder during a combustion event via a direct injector and a port injector is adjusted based on engine vacuum demand. For example, while no engine knock occurs, a ratio of fuel injected via the direct injector relative to the port injector is increased as the engine vacuum demand increases above a threshold. The engine vacuum demand may include one or more of purge vacuum demand, crankcase ventilation vacuum demand, and vacuum consumer vacuum demand.

In another example, an engine system comprises an engine cylinder, a direct injector configured to direct inject fuel into the engine cylinder, a port injector configured to port inject fuel into the engine cylinder, an intake throttle, a knock sensor coupled to an engine block, and a controller. The controller may be configured with computer readable instructions for, during part load conditions, decreasing an injection pulse width of the port injector while correspondingly increasing an injection pulse width of the direct injector in response to a temporary increase in engine vacuum demand. Further, while increasing the pulse width of the direct injector, the controller may increase throttling of the air intake throttle to increase engine intake manifold vacuum. The controller may include further instructions for, while increasing the pulse width of the direct injector, drawing vacuum from the engine intake manifold for one or more of fuel vapor canister purging, crankcase ventilation, and actuation of a vacuum consumption device, the vacuum consumption device including a brake booster. In addition, the controller may further decrease the injection pulse width of the port injector while correspondingly further increasing the injection pulse width of the direct injector in response to an indication of cylinder knock.

In this way, a split ratio of fuel delivered to an engine cylinder via each of a direct injector and a port injector may be adjusted based on engine vacuum demand. By shifting the split ratio towards increased direct injection of fuel responsive to an increase in engine vacuum demand, the extra pumping work of an intake throttle, that is required due to increased charge cooling effect of the direct injection, can be advantageously used to lower manifold pressure and increase engine vacuum generation. By trading the pumping efficiency provided by port fuel injection for the vacuum generation efficiency provided by direct fuel injection, operator torque demand and engine vacuum demand can be met at the same time.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
in response to engine vacuum generation being lower than a vacuum demand,
increasing a proportion of fuel injected into a cylinder via direct injection while correspondingly decreasing a proportion of the fuel injected into the cylinder via port injection.

2. The method of claim 1, wherein the increasing and decreasing includes adjusting a ratio of fuel injected into the cylinder during a combustion event via a direct injector and a port injector based on the vacuum demand.

3. The method of claim 1, where increasing the proportion of fuel injected into the cylinder via direct injection while correspondingly decreasing the proportion of the fuel injected into the cylinder via port injection includes increasing a pulse width of direct fuel injection while correspondingly decreasing a pulse width of port fuel injection to the cylinder.

4. The method of claim 1, further comprising, while increasing the proportion of direct injected fuel, increasing throttling of intake aircharge.

5. The method of claim 1, wherein the increasing the proportion of fuel injected via direct injection is based on a difference between the vacuum demand and the engine vacuum generation, the engine vacuum generation estimated based on an engine intake manifold vacuum level.

6. The method of claim 5, further comprising maintaining fuel injection with the increased proportion of direct injection until the engine intake manifold vacuum level is at or above the vacuum demand.

7. The method of claim 1, wherein the engine includes a turbocharger, and wherein the increasing includes increasing while the engine is operating without boost.

8. The method of claim 1, wherein the increasing includes increasing while engine load is lower than a threshold level.

9. The method of claim 1, wherein the vacuum demand is based on one or more of canister purge vacuum demand, crankcase ventilation vacuum demand, and vacuum consumer demand from a vacuum consumer including a brake booster.

10. The method of claim 1, further comprising, when engine vacuum generation is higher than the vacuum demand, increasing the proportion of fuel injected into the cylinder via direct injection while correspondingly decreasing the proportion of the fuel injected into the cylinder via port injection in response to an indication of cylinder knock.

11. A method for an engine, comprising:
responsive to a first condition including the engine operating at part load and with vacuum requirement below a threshold, direct injecting a first amount of fuel and port injecting a second amount of fuel into a cylinder; and
responsive to a second condition including the engine operating at the part load and with vacuum requirement above the threshold, increasing the first amount of direct injected fuel while correspondingly decreasing the second amount of port injected fuel into the cylinder.

12. The method of claim 11, further comprising, during the first condition, throttling an air intake throttle less during the fuel injection and during the second condition, throttling the air intake throttle more during the fuel injection.

13. The method of claim 12, wherein the increasing the first amount of direct injected fuel during the second condition is based on a difference between an actual intake manifold vacuum level and the threshold, and wherein the decreasing the second amount is based on the increasing the first amount to maintain combustion at or around a desired air-to-fuel ratio.

14. The method of claim 13, wherein fuel injection with the increased first amount and the decreased second amount is maintained until the actual intake manifold vacuum level is at or above the threshold, and then initial fuel injection proportions are resumed.

15. The method of claim 11, further comprising, during a third condition including the engine operating at the part load and with engine vacuum requirement above the threshold, increasing the first amount of direct injected fuel while correspondingly decreasing the second amount of port injected fuel into the cylinder in response to an indication of cylinder knock, the increasing during the third condition being more than the increasing during the second condition.

16. The method of claim 15, wherein the increasing during the third condition is based on the indication of cylinder knock, the increasing maintained until the indication of cylinder knock is lower than a knock threshold.

17. The method of claim 11, further comprising indicating that the engine is operating at the part load when engine load is below a threshold load.

18. The method of claim 11, further comprising indicating that the engine is operating at the part load when boost pressure is lower than a threshold pressure.

19. A method for an engine comprising:
determining a vacuum demand;
determining an amount of engine vacuum generation of the engine; and
in response to the determined engine vacuum generation being lower than the determined vacuum demand, increasing a proportion of fuel injected into a cylinder via direct injection while correspondingly decreasing a proportion of the fuel injected into the cylinder via port injection.

20. The method of claim 19, wherein the increasing the proportion of fuel injected via direct injection is based on a difference between the determined vacuum demand and the determined engine vacuum generation, the determined engine vacuum generation determined based on an engine intake manifold vacuum level.

* * * * *